United States Patent

Bodin et al.

[11] Patent Number: 5,301,356
[45] Date of Patent: Apr. 5, 1994

[54] PRIORITIZATION BETWEEN HANDOFF AND NEW CALL REQUESTS IN A CELLULAR COMMUNICATIONS SYSTEM

[75] Inventors: Stig R. Bodin, Spanga; Harald Kallin, Sollentuna; Lotta Voigt, Stockholm, all of Sweden

[73] Assignee: Telefonaktiebolaget L M Ericsson, Stockholm, Sweden

[21] Appl. No.: 804,604

[22] Filed: Dec. 10, 1991

[51] Int. Cl.$^5$ ............................................. H04B 7/26
[52] U.S. Cl. ................................. 455/33.2; 455/34.1; 455/56.1; 379/60
[58] Field of Search ................... 455/33.1-33.4, 455/53.1, 54.1, 54.2, 56.1, 34.1; 375/59, 60, 63

[56] References Cited

U.S. PATENT DOCUMENTS

| | | | |
|---|---|---|---|
| Re. 32,789 | 11/1988 | Lynk, Jr. et al. | 379/58 |
| 4,242,538 | 12/1980 | Ito et al. | 455/89 |
| 4,475,010 | 10/1984 | Huensch et al. | 455/33.2 |
| 4,654,867 | 3/1987 | Labedz et al. | 379/59 |
| 4,670,899 | 6/1987 | Brody et al. | 379/60 |
| 4,726,050 | 2/1988 | Menich et al. | 379/60 |
| 4,737,978 | 4/1988 | Burke et al. | 379/60 |
| 4,775,998 | 10/1988 | Felix et al. | 379/59 |
| 5,081,671 | 1/1992 | Raith et al. | 379/60 |

FOREIGN PATENT DOCUMENTS 2220117A 12/1989 United Kingdom .

Primary Examiner—Reinhard J. Eisenzopf
Assistant Examiner—Chi Pham
Attorney, Agent, or Firm—Burns, Doane, Swecker & Mathis

[57] ABSTRACT

A method and system for ensuring that handoff requests take priority over new cell requests to engage voice channels assigned to a particular target cell are provided. A certain number of channels are reserved for handoff requests. However, if no channels, reserved or unreserved, are available, handoff requests to a particular target cell are stored in a corresponding queue for a predetermined period of time. Thus, when voice channels become available, they are seized in order to satisfy the handoff requests stored in that queue. If the handoff queue is empty, new call requests to a target cell may be assigned to available voice channels.

12 Claims, 8 Drawing Sheets

— HARDWIRE CONNECTION
- - - REQUEST FOR SIGNAL STRENGTH MEASUREMENT AND REPLY

PRIORITIZATION BETWEEN HANDOFF AND NEW CALL REQUESTS IN A CELLULAR COMMUNICATIONS SYSTEM

FIELD OF THE INVENTION

The present invention relates to cellular mobile radiotelephone systems. More particularly, the present invention is directed to a system for prioritizing handoff and new call requests.

BACKGROUND

Conventional cellular mobile radio telephone systems are controlled by at least one mobile switching center, or MSC (also known as a mobile telephone switching office), at least one base station, and at least one mobile station. The mobile switching center constitutes an interface between the radio-based cellular system and the public switching telephone network. The base station acts essentially as a conduit for information between the mobile stations and the mobile switching center. Calls to and from mobile subscribers are switched by the mobile switching center. The mobile switching center also provides all signalling functions needed to establish the calls.

In order to obtain adequate radio coverage of a geographical area, plural base stations are normally required. The area is divided into cells, and each cell may either be serviced by its own base station or may share a base station with a number of other cells. Each cell has an associated control channel over which control (non-voice) information is communicated between the mobile stations in that cell and the base station. Generally, the control channel includes a dedicated channel at a known frequency over which certain information is communicated from the base station to mobile stations, a paging channel for unidirectional transmissions of information from the base station to the mobile stations, and an access channel for bi-directional communications between the mobile stations and the base station. These various channels may share the same frequency, or they may operate at different respective frequencies.

In addition to a single control channel, each cell is assigned a predetermined number of voice channels for communicating the content of a communication between two subscribers. That content may be analog or digitized voice signals or digital data signals. Depending on the access mode of the cellular system, each voice channel may correspond to a separate frequency in Frequency Division Multiple Access (FDMA), a separate frequency and time slot or slots in Time Division Multiple Access (TDMA), or a separate code in Code Division Multiple Access (CDMA). The present invention may be implemented using any of these multiple access techniques.

Typically the cells are of relatively small size, and there is a high probability that a mobile station will move from one cell to another. The process of transferring an ongoing mobile communication from one cell base station to another cell base station is called "handoff". It is important that handoffs be accomplished rapidly and reliably if communications are to continue without interruption as mobile stations exit one cell and enter another.

The mobile switching center supervises the handoff of mobile station call connections between various base stations. Each base station continuously measures a signal parameter, typically signal strength, of ongoing calls of mobile stations within its cell. When the measured signal parameter associated with a particular mobile station falls below a predetermined threshold, indicating that the quality or strength of that call connection is or is becoming unacceptable, the base station requests a handoff of that call connection from the mobile switching center. The mobile switching center selects a target base station receiving the strongest signal from the mobile station to be handed off and an associated voice channel to take over the handedoff call connection. In other embodiments, handoff decisions may be based not only on signal strength but also on other factors such as signal quality based on bit error rate (BER), hysteresis, etc. or a combination of factors. The original base station orders the mobile station to tune to the selected voice channel of the target base station.

Unfortunately, each cell is allocated only a limited number of voice channels. During peak use periods or in congested, urban areas, many of the available voice channels may be occupied. In those situations where a target base station has no available voice channels, a mobile station cannot be handed off, and a new target base station must be selected. Selection of a second target base station often is either not possible or unacceptable. First, there may not be any other target base stations receiving a signal of sufficient strength from the mobile station to be handed off. Second, by the time a base station having an available voice channel is located, the call connection may have deteriorated to an unacceptable level or been lost altogether. Third, like the original target base station, subsequent target base stations may not have available voice channels. Handoff requests for ongoing call connections are not the only requests for available voice channels in a particular cell. New call connection requests also compete for available voice channels.

One system which addresses the problem of blocked handoff requests is disclosed in U.S. patent application Ser. No. 07/341,584, filed Apr. 21, 1989, entitled "A Method of Reducing Blockages in Handing Over Calls in a Mobile Cellular Telephone System," which is incorporated herein by reference.

U.S. Pat. No. 4,670,899 to Brody et al. discloses a dynamic load distribution system where ongoing calls are selectively transferred to adjacent cells in accordance with the traffic level in order to reserve channels for handoffs and new calls. In one mode of operation called "directed retry", voice channels are reserved for incoming handoffs by directing a particular cell to deny access to mobile transceivers initiating new calls. Cells in a directed retry state refuse acceptance of new calls in order to reserve channels for handoff attempts. This directed retry state is based on the voice channel occupancy level of a cell. If the number of handoff requests exceeds the number of available channels, reserved and unreserved, a new call or directed retry request is not accepted.

While the Brody system makes some provision for call handoffs, Brody's focus is at the multiple cell level. Brody is primarily concerned with balancing the call connection load among all of the cells. Thus, handoff requests to a particular target cell are not considered in the load balancing process.

It would be desirable to prioritize handoff requests for individual target base stations. In addition, it would be desirable to set up storage queues of handoff requests for each target base station so that when a voice channel becomes available at a particular, target base station, a queued handoff request to that target station is serviced before other handoff and call requests.

SUMMARY

To reduce the probability of losing call connections when attempting to handoff a call connection to a target base station having a full load, the present invention is directed to a method and apparatus for ensuring that handoff requests take priority over new call requests to engage voice channels assigned to a specific target cell. Initially, a determination is made as to whether any voice channels of the target cell are available for assignment to call requests. If none are available, handoff requests to the target cell are stored in a corresponding queue for a predetermined period of time. If or when one or more voice channels become(s) available in the target cell during the predetermined time period, the queue is examined for any handoff requests. Those handoff requests stored in the queue may be assigned to the available voice channels. If or when the queue is empty, new call requests are assigned to the available voice channels.

According to another embodiment of the present invention, in a cellular mobile radio telephone communications system having plural geographically separated radio base stations serving corresponding plural geographical cells, a method is provided for prioritizing new-call and handoff requests for currently engaged voice channels assigned to a target geographical cell. A predetermined number of voice channels are reserved at the target cell for servicing only handoff requests. Handoff requests are queued when no reserved or unreserved channels are available within the target cell. Queued handoff requests are assigned to voice channels that become available in the target cell. Newcall requests are assigned to unreserved voice channels that become available in the target cell when no handoff requests are in the queue.

According to another embodiment of the present invention, a cellular mobile radio telephone communication system is provided for insuring that handoff requests take priority over new-call requests to available voice channels assigned to a geographical target cell. A mobile switching center prevents new-call requests from seizing an available voice channel in a target cell if the number of available voice channels is less than a preset number. Only a handoff request is allowed to seize an available voice channel in the target cell if the number of available voice channels is less than the preset number. When a target cell has no available voice channels, the mobile switching center also maintains a queue for each target cell in which handoff requests to a corresponding target cell are stored. New-call requests are allowed to seize available voice channels in the target cell only if no handoff requests are stored in the corresponding queue and if the number of available voice channels exceeds the preset number.

BRIEF DESCRIPTION OF THE DRAWINGS

The features and advantages of the invention will be understood from reading the following detailed description in conjunction with the drawings, in which.

DETAILED DESCRIPTION

Before describing the details of the present invention, an example of the construction of a cellular mobile radio system in which the present invention can be used will be described.

Figure 1:
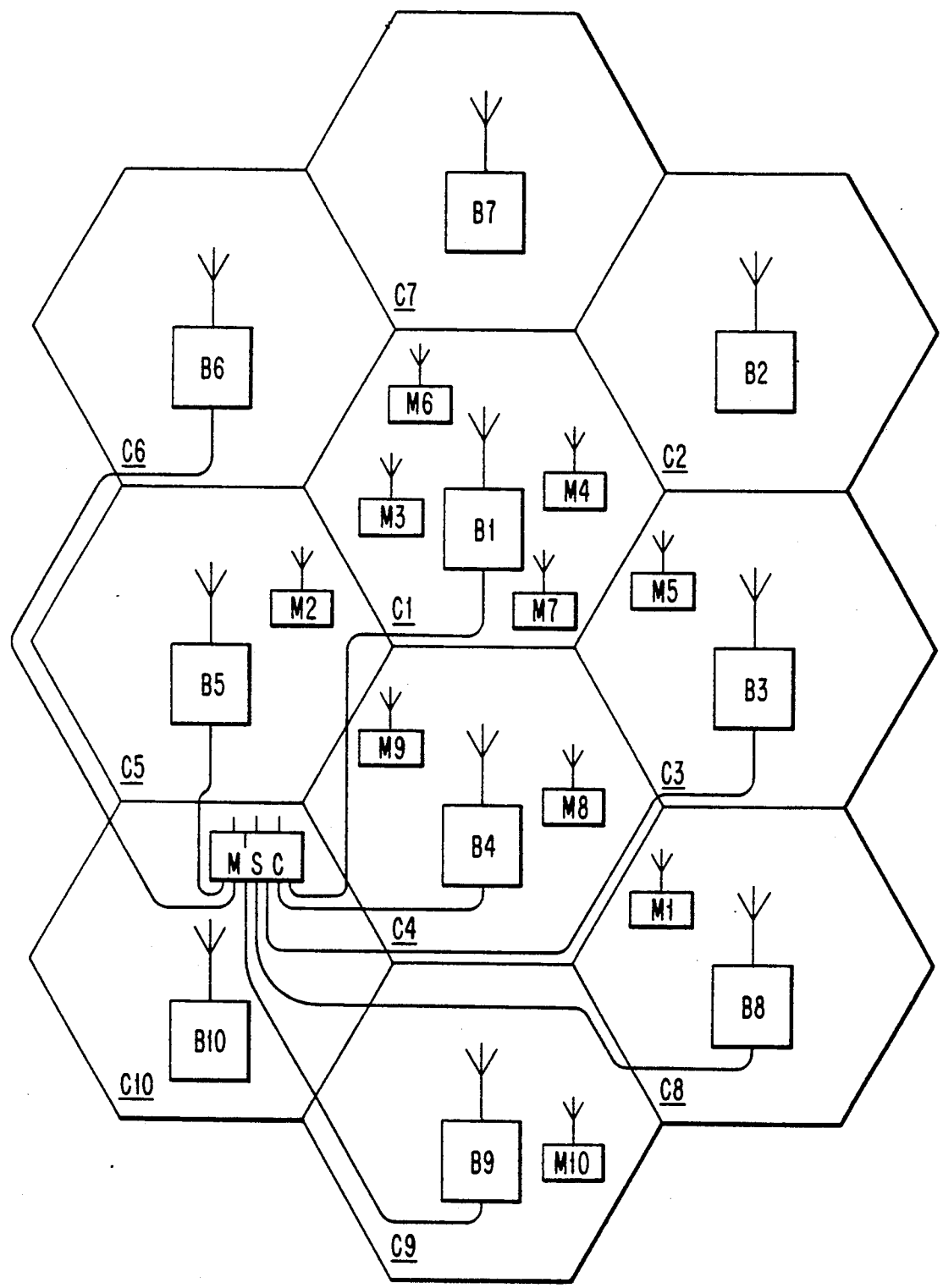
FIG. 1 is a schematic diagram illustrating an example of a cellular mobile radio system, illustrating the relationship of the system's cells, a mobile switching center, base stations and mobile stations.

FIG. 1 is a schematic diagram illustrating ten cells, C1 to C10, in a cellular mobile radio telephone system. Normally the method according to the present invention would be implemented in a cellular mobile radio system comprising many more cells than ten. For purposes of this description, the system depicted herein is considered to be an isolated portion of a larger system which has been fragmented.

For each cell C1 to C10, there is a respective base station B1 to B10. FIG. 1 illustrates base stations situated in the vicinity of the respective cell centers and having omni-directional antennas. The base stations of adjacent cells may however be located in the vicinity of cell borders and have directional antennas.

FIG. 1 also illustrates ten mobile stations M1 to M10, which are movable within a cell and from one cell to another cell. The method according to the present invention may be implemented in a cellular mobile radio system comprising many more mobile stations than ten. In particular, there are normally many more mobile stations than there are base stations.

Also illustrated in FIG. 1 is a mobile switching center MSC. The mobile switching center is connected to all ten illustrated base stations by cables. The mobile switching center is also connected by cables to a fixed public switching telephone network PSTN or similar fixed network with ISDN facilities. All cables from the mobile switching center to base stations and cables to the fixed network are not illustrated. Further, other media may be used instead of cables for base to mobile switching center communications, e.g., fixed radio links.

The cellular mobile radio system illustrated in FIG. 1 includes a plurality of radio channels for communication. The system is designed both for analog information, e.g., speech, digitized analog information, e.g., digitized speech, and pure digital information, e.g., pure digital data. In the context of the present invention, the term connection is used for a communication channel between a mobile station and another mobile station in the same system or another system, between two fixed telephones or terminals in a fixed network connected through the cellular mobile radio telephone system, or between a mobile station and a fixed telephone. A connection may be a call where two people talk to each other, but may also be a data communication channel where computers exchange data.

Each cellular system is assigned a particular frequency band over which it can operate. A set of communication channels is allocated to each cell. For example, between ten and thirty different voice channels and one control channel may be allocated to any given cell. Different sets of communication channels must always be allocated to neighboring cells since, in order to maintain full radio coverage, cells overlap each other. Using the same channels in adjacent cells would cause co-channel interference in these overlapping areas.

Figure 2:
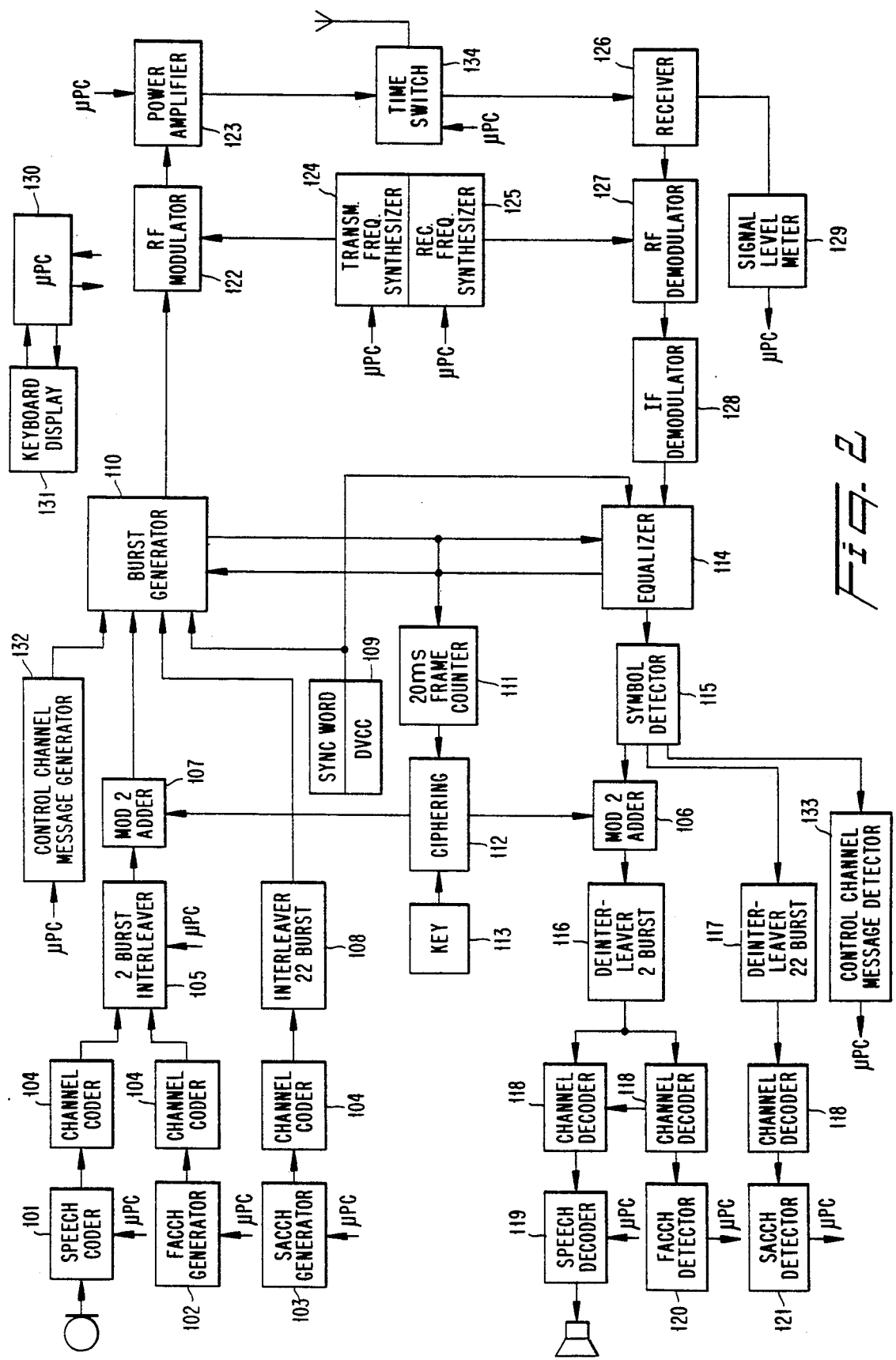
FIG. 2 is a block diagram illustrating a digital mobile station in a cellular mobile radio system according to FIG. 1.

Referring now to FIG. 2, an embodiment of a mobile station that can be utilized in a cellular telephone system that operates in accordance with the present invention is illustrated. This particular example pertains to a mobile station that can be used in a digital communications system, i.e., one in which digitized voice information is transmitted between base and mobile stations. Furthermore, the operation of the system is explained in the context of full-rate transmissions in a time division multiple access (TDMA) system, in which each packet of digital information is interleaved over two spaced time slots in a frame of data. It will be readily appreciated, however, that the invention is equally applicable to other types of cellular radio systems, such as those in which information is transmitted in an analog format, transmitted digitally at a half rate, or transmitted in other access modes such as frequency division multiple access (FDMA) or code division multiple access (CDMA).

In the mobile station depicted in FIG. 2, a speech coder 101 converts the analog signal generated by a microphone into a binary data stream. The data stream is then divided into data packets, according to the TDMA principle. A fast associated control channel (FACCH) generator 102 generates control and supervision signalling messages that are transmitted from the mobile station to the land-based system. The FACCH message replaces a user frame (speech/data) whenever it is to be transmitted. A slow associated control channel (SACCH) generator 103 provides signalling messages that are transmitted over a continuous channel for the exchange of information between the base station and the mobile station and vice-versa. A fixed number of bits, e.g., twelve, is allocated to the SACCH for each time slot of a message train. Channel coders 104 are respectively connected to the speech coder 101, FACCH generator 102, and SACCH generator 103 for manipulating the incoming data in order to carry out error detection and correction. The techniques used by the channel coders 104 are preferably convolutional encoding, which protects important data bits in the speech code, and cyclic redundancy check (CRC), wherein the perceptually significant bits in the speech coder frame, e.g., twelve bits, are used for computing a seven-bit check.

A two-burst interleaver 105 is connected to the channel coders 104 associated with the speech coder 101 and the FACCH generator 102, respectively. The two-burst interleaver 105 is controlled by a microprocessor controller 130 so that, at appropriate times, user information over a particular speech channel is replaced with system supervision messages over the FACCH. Data to be transmitted by the mobile station is interleaved over two distinct time slots. A packet of 260 data bits, which constitute one transmitting word, is divided into two equal parts and is interleaved over two different time slots. The effects of RAYLEIGH fading are reduced in this manner. The output of the two-burst interleaver 105 is provided to the input of a modulo-two adder 107 so that the transmitted data is ciphered bit-by-bit by logical modulo-two-addition of a pseudo-random bit stream.

The output of the channel coder 104 associated with the SACCH generator 103 is connected to a 22-burst interleaver 108. The 22-burst interleaver 108 interleaves data transmitted over the SACCH over twenty-two time slots each consisting of twelve bits of information.

The mobile station further includes a Sync Word/DVCC generator 109 for providing the appropriate synchronization word (Sync Word) and DVCC (digital verification color code) to be associated with a particular connection. The Sync Word is a twenty-eight-bit word used for time slot synchronization and identification. The DVCC is an eight-bit code which is sent by the base station to the mobile station and vice-versa, for assuring that the proper channel is being decoded.

A burst generator 110 generates message bursts for transmission by the mobile station. The burst generator 110 is connected to the outputs of the modulo-two-adder 107, the 22-burst interleaver 108, the Sync Word/DVCC generator 109, an equalizer 114, and a control channel message generator 132 to integrate the various pieces of information from these respective units into a single message burst. For example, according to the published U.S. standard EIA/TIA IS-54, a message burst comprises data (260 bits), SACCH (12 bits), Sync Word (28 bits), coded DVCC (12 bits), and 12 delimiter bits, combined for a total of 324 bits. Under the control of the microprocessor 130, two different types of message bursts are generated by the burst generator 110: control channel message bursts from the control channel message generator 132, and voice/traffic message bursts. The control channel message replaces the SACCH as well as the speech data normally generated in a voice/traffic burst.

The transmission of a burst, which is equivalent to one time slot, is synchronized with the transmission of other time slots, which together make up a frame of information. For example, under the U.S. standard, a frame comprises three full-rate time slots. The transmission of each burst is adjusted according to timing control provided by the equalizer 114. Due to time dispersion, an adaptive equalization method is provided in order to improve signal quality. For further information regarding adaptive equalization techniques, reference is made to U.S. patent application Ser. No. 315,561, filed Feb. 27, 1989, and assigned to the same assignee. Briefly, the base station functions as the master and the mobile station is the slave with respect to frame timing. The equalizer 114 detects the timing of an incoming bit stream from the base station and synchronizes the burst generator 110. The equalizer 114 is also operable for checking the Sync Word and DVCC for identification purposes.

A frame counter 111 is coupled to the burst generator 110 and the equalizer 114. The frame counter 111 updates a ciphering code utilized by the mobile station for each transmitted frame, e.g., once every 20 ms. A ciphering unit 112 is provided for generating the ciphering code utilized by the mobile station. A pseudorandom algorithm is preferably utilized. The ciphering unit-112 is controlled by a key 113 which is unique for each subscriber. The ciphering unit 112 consists of a sequencer which updates the ciphering code.

The burst produced by the burst generator 110, is forwarded to an RF modulator 122. The RF modulator 122 is operable for modulating a carrier frequency according to the $\pi/4$-DQPSK method ($\pi/4$ shifted, Differentially encoded Quadrature Phase Shift Keying). The use of this technique implies that the information is differentially encoded, i.e., 2-bit symbols are transmitted as four possible changes in phase: $\pm \pi/4$ and $\pm 3\pi/4$. The transmitter carrier frequency supplied to the RF modulator 122 is generated by a transmitting frequency synthesizer 124 in accordance with the selected transmitting channel. Before the modulated carrier is transmitted by an antenna, the carrier is amplified by a power amplifier 123. The RF power emission level of the amplifier is selected on command by a microprocessor controller 130.

A receiver carrier frequency signal is generated in accordance with the selected receiving channel by a receiving frequency synthesizer 125. Incoming radio frequency signals are received by a receiver 126, the strength of each signal being measured by a signal level meter 129. The received signal strength value is then sent to the microprocessor controller 130. An RF demodulator 127, which receives the receiver carrier frequency signal from the receiving frequency synthesizer 125 and the radio frequency signal from the receiver 126, demodulates the radio frequency carrier signal, thus generating an intermediate frequency. The intermediate frequency signal is then demodulated by an IF demodulator 128, which restores the original $\pi/4$-DQPSK-modulated digital information.

The restored digital information provided by the IF demodulator 128 is supplied to the equalizer 114. A symbol detector 115 converts the received two-bit symbol format of the digital data from the equalizer 114 to a single-bit data stream. The symbol detector 115 in turn produces three distinct output signals. Control channel messages are sent to a control message detector 133 which supplies detected control channel information to the microprocessor controller 130. A modulo-two adder 106 and a two-burst deinterleaver 116 reconstruct the speech data/FACCH data by assembling and rearranging information from two time slots of the received data. The symbol detector 115 supplies SACCH data to a 22-burst deinterleaver 117. The 22-burst deinterleaver 117 reassembles and rearranges the SACCH data spread over twenty-two consecutive frames.

The two-burst deinterleaver 116 provides the speech data/FACCH data to two channel decoders 118. The convolutionally encoded data is decoded using the reverse of the above-described coding principle. The received cyclic redundancy check (CRC) bits are checked to determine if any error has occurred. The FACCH channel coder furthermore detects the distinction between the speech channel and any FACCH information, and directs the channel decoders 118 accordingly. A speech decoder 119 processes the received speech data from the channel decoder 118 in accordance with a speech decoder algorithm (e.g., VSELP), and generates the received speech signal. The analog signal is finally enhanced by a filtering technique. Messages on the fast associated control channel are detected by a FACCH detector 120, and the information is transferred to the microprocessor controller 130.

The output of the 22-burst deinterleaver 117 is provided to a separate channel decoder 118. A SACCH detector 121 detects messages on the slow associated control channel and transfers that information to the microprocessor controller 130.

The microprocessor controller 130 controls the mobile station activity and the base station communication, and also handles the input and output from a terminal keyboard and display unit 131. Decisions by the microprocessor controller 130 are made in accordance with received messages and measurements that are made. The keyboard and display unit 131 enables information to be exchanged between the user and the base station.

Figure 3:
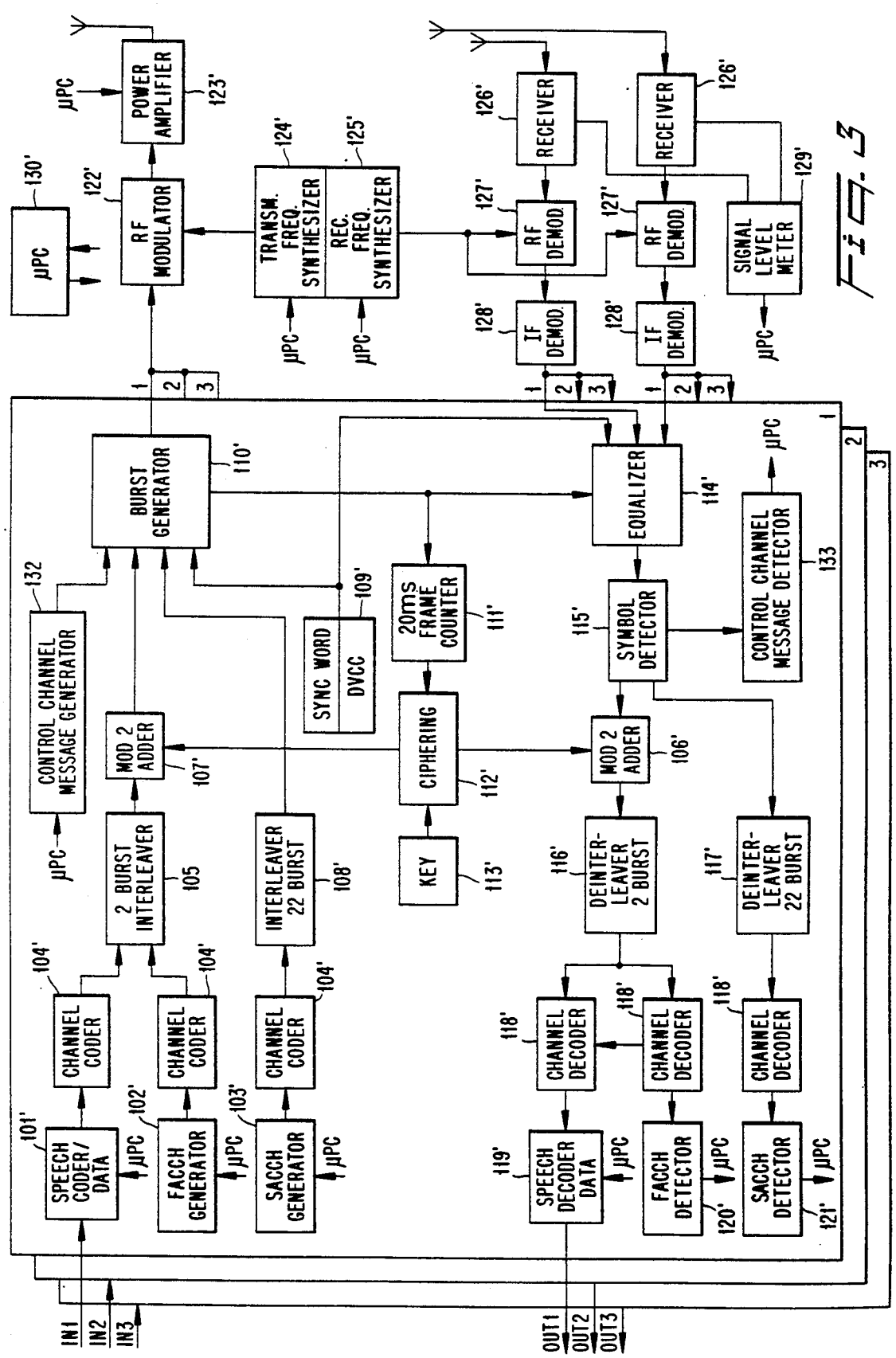
FIG. 3 is a block diagram illustrating a digital base station in a cellular mobile radio system according to FIG. 1.

FIG. 3 illustrates an embodiment of a base station that can be utilized in a cellular telephone system that operates in accordance with the present invention. The base station incorporates numerous component parts which are substantially identical in construction and function to component parts of the mobile station illustrated in FIG. 2 and described in conjunction therewith. Such identical component parts are designated in FIG. 3 with the same reference numerals utilized hereinabove in the description of the mobile station, but are differentiated therefrom by means of a prime (') designation.

There are, however, some distinctions between the mobile and base stations. For instance, the base station has two receiving antennas. Associated with each of these receiving antennas is a receiver 126', an RF demodulator 127', and an IF demodulator 128'. Furthermore, the base station does not include a user keyboard and display unit 131 as utilized in the mobile station.

In conventional Frequency Division Multiple Access (FDMA) systems, i.e., analog cellular, all base stations have signal strength receivers that measure the current signal strength of signals on all frequencies used in adjacent cells. When a call connection between a mobile and its home base station deteriorates in strength and/or quality, the mobile's currently assigned or "home" base station requests a handoff with the "home" Mobile Switching Center MSC. Before an actual handoff, however, the MSC executes a "locating" process. After the handoff request, the MSC locates or identifies available neighboring cells, if any, that could satisfactorily handle the call handoff. A neighboring base station is a base station that is physically located so that it may measure the signal strength of a mobile assigned to another base station. Typically, the neighboring base stations correspond to the cells adjacent to the cell of the home base station. However, neighboring base stations may also correspond to adjacent cells. By way of comparison, a target base station is a neighboring base station receiving the optimal (e.g., the strongest) signal from the mobile to be handed off. It should be recognized that while a handoff is usually to another voice channel assigned to a neighboring base station, a handoff may also be made between voice channels assigned to the home base station to improve voice quality.

Figure 4:
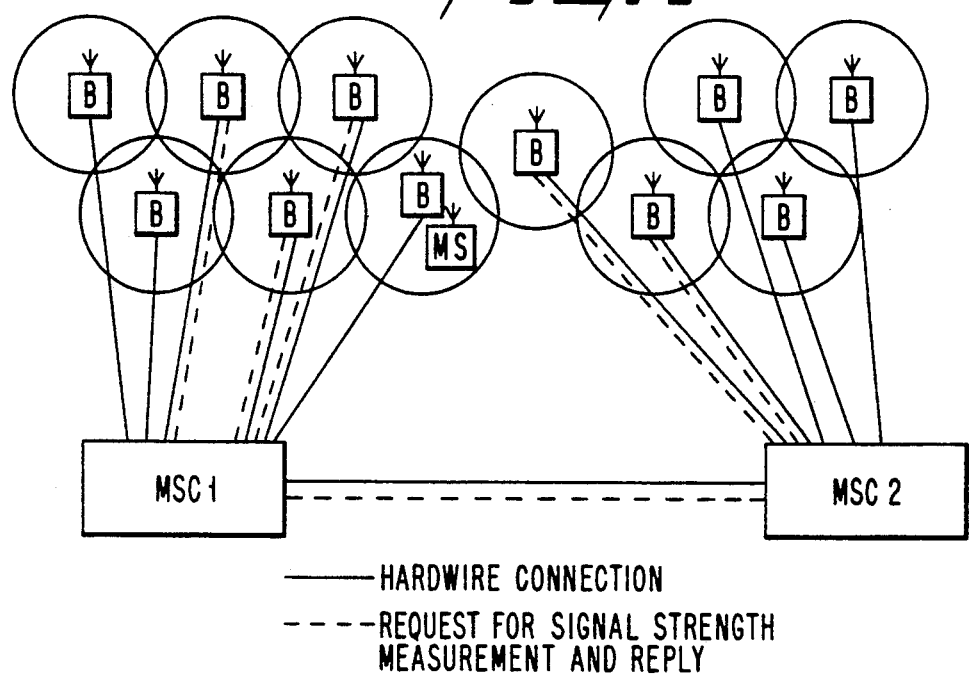
FIG. 4 illustrates a locating process carried out by a mobile switching center.

The locating procedure is illustrated in a simplified manner in FIG. 4. The dashed lines represent requests from a home MSC (MSC1) for signal strength measurements and replies from neighboring base stations. The home MSC1 may also request and receive signal strength measurements from neighbor bases stations assigned to neighboring MSC's, e.g., MSC2, for signal strength measurements on the particular call connection frequency over which that mobile is currently communicating. Such measurements would be requested/received when the mobile's current cell has a neighboring cell controlled by another MSC. The signal strength receivers may be equipped with a memory for storing regular signal strength measurements, or the signal strength measurements may be made at the time of the request.

When all of the signal strength measurements are received from all of the neighboring cells, the MSC evaluates the potential suitability of all neighboring cells based on several criteria: signal strength, hysteresis, offset, connection parameters, etc. Very often a neighboring base station having satisfactory signal strength measurements cannot be located. However, if acceptable neighboring cells are available for consideration, the MSC then must determine if any of these candidate cells have free voice channels to assume the handoff call connection. For example, if two suitable cells are identified and one cell is congested, the other cell is selected for the handoff. On the other hand, if more than one satisfactory base station is located, the MSC selects a target base station having the most optimal measurement value, e.g., greatest signal strength.

In digital cellular systems using Time Division Multiple Access (TDMA), each mobile station may assist in collecting signal strength information. Because a mobile station transmits information in one time slot and receives information during another time slot, it has time to monitor signal strength data assuming there are more than two time slots per frequency. The mobile station measures the strengths of control signals on selected frequencies associated with neighboring cells. These strength signals are then reported to the home base station over the SACCH. The home base station evaluates the signal strength information in much the same way as the MSC does in analog, FDMA systems, and a handoff request is issued to the MSC. While this assistance from the mobile station has been termed Mobile-Assisted Handoff (MAHO), it is more accurately termed mobile-assisted locating.

Figure 5:
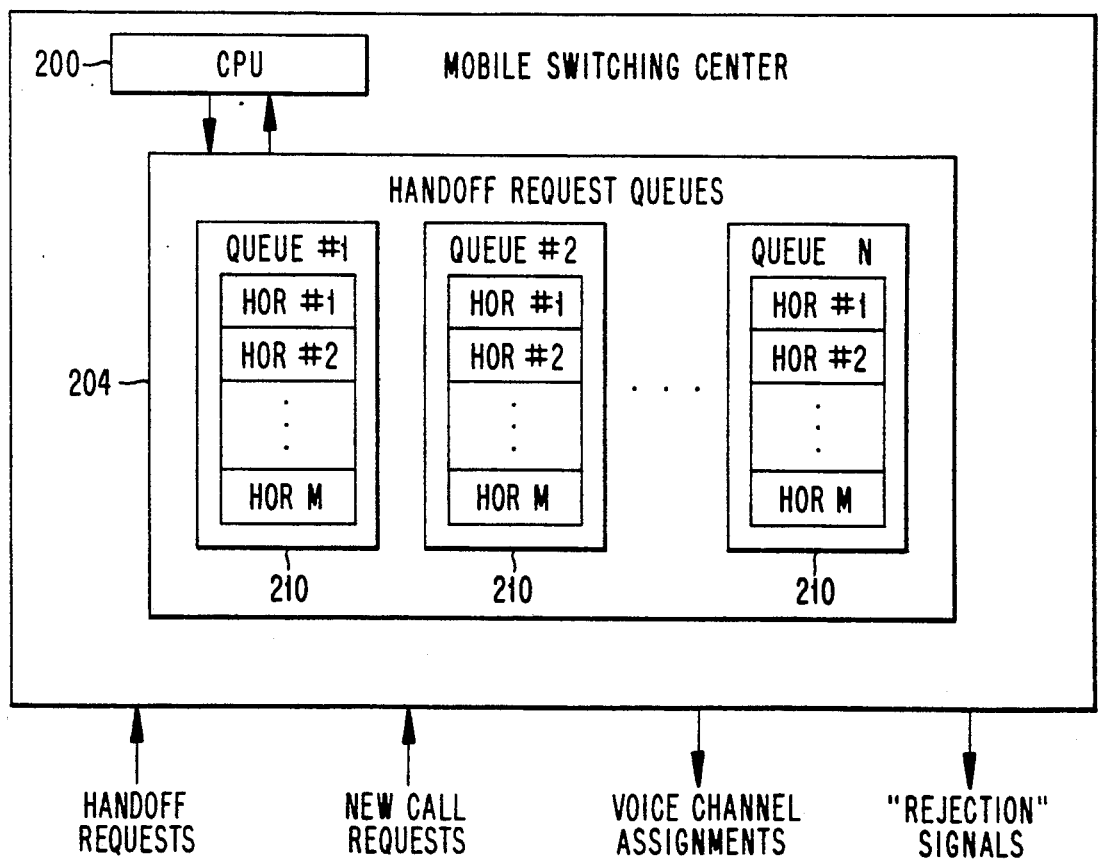
FIG. 5 is a block diagram illustrating a mobile switching center.

A more detailed description of the mobile switching center (MSC) will now be provided in conjunction with FIG. 5. A central processing unit 200 controls the input of various received information and the output of numerous signal commands. As described above, the central processing unit 200 receives signal parameters, such as signal strength, relating to call connections between the base stations under the MSC's control and various mobile stations. The MSC also processes signal strengths from base stations associated with other mobile switching centers to allow handoff across the border between two MSC's These signal connection parameters may be stored in a signal strength memory in the form of a look-up table. The central processing unit 200 determines the optimal base station corresponding to the greatest signal strength for handling a particular handoff request.

The central processing unit 200 is also connected to a handoff request queue memory 204. The central processing unit 200 maintains a plurality of queues 210 for each target base station/cell. Each target cell queue may be, for example, a first-in-firstout (FIFO) stack memory for storing handoff requests to that particular target cell. Of course, other queuing techniques may be used such as last-in-first-out (LIFO). As an example, cell No. 1 may not have any available radio channels for additional call connections whether they be handoff requests or new call requests. In that instance, each handoff request (HOR) would be stored in queue No. 1 with the earliest or oldest handoff request HOR No. 1 being stored at the top of the queue and the most recent or youngest handoff request HOR M being stored at the bottom of the queue. When a communications channel in target cell No. 1 becomes available, the handoff request at the top of the queue HOR No. 1 is removed from the top of the queue 210 and assigned by the central processing unit 200 to that available voice channel. In a similar fashion, queue No. 2 corresponds to target cell No. 2 and queue N corresponds to target cell N, N corresponding to the number of cells controlled by the mobile switching center.

In conjunction with the handoff request queues 204, the central processing unit 200 includes a software timing routine for monitoring the length of time particular handoff requests have been stored in their respective handoff request queues 210. For each individual queue 210, the timer routine records the length of time each handoff request (HOR) has been stored in that queue. In effect, each HOR has an associated "time stamp" which ensures that the HOR does not become stale because of changed system or parameter conditions. Once the software time stamp expires, the central processing unit 200 removes the associated handoff request HOR from the queue. This limited life of handoff requests in their respective queues also ensures that if no handoff is possible to a particular target cell, each handoff request is directed to another target cell which may be able to satisfy the handoff request. Without such a time limit, the call connection associated with the queued handoff request could deteriorate and eventually be lost. In this way, some definitive action is taken before such deterioration or loss occurs.

The mobile switching center central processing unit 200 also receives new call requests from subscribers initiating a call connection to or from mobile stations within one of the cells under the mobile switching center's control. As described in greater detail below, the central processing unit 200 assigns these new call requests to available voice channels in a particular target cell only if the queue 210 corresponding to that target cell is empty and if there are available voice channels not reserved for handoff requests. A predetermined number of available voice channels in each cell may be specified by the mobile switching center as reserved for handoff requests. In other words, once the number of available or unoccupied channels is less than or equal to that predetermined number, those remaining channels may not be assigned to new call requests. Only handoff requests may be assigned. The predetermined number may, of course, be varied depending on system needs.

In this fashion, the central processing unit 200 ensures that handoff requests take priority over new-call requests. More specifically, the present invention insures that handoff requests specific to a particular target cell always have priority use of reserved and unreserved voice channels in a particular target cell as they become available.

Figure 6:
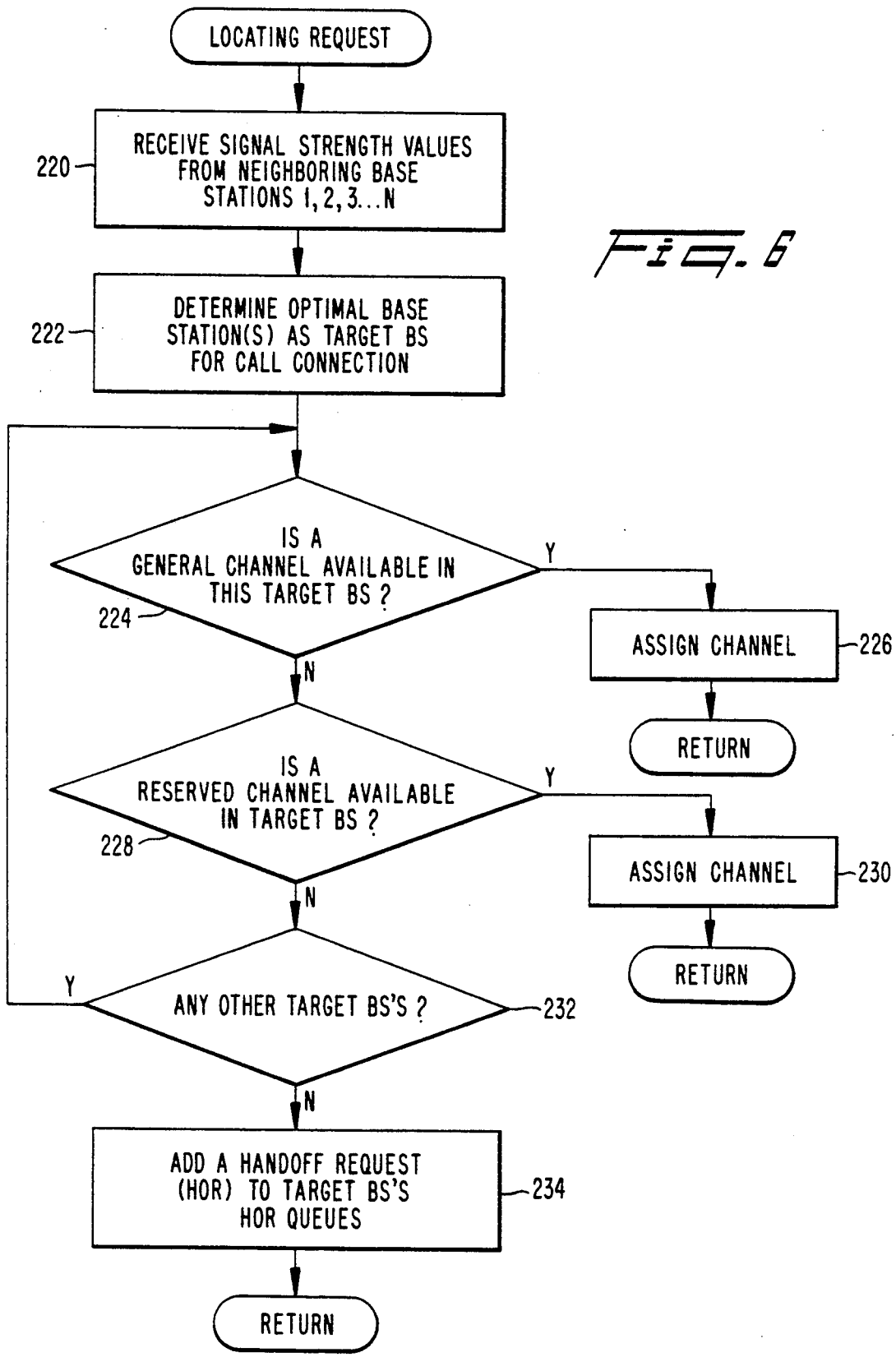
FIG. 6 is a flow chart of a control procedure for locating neighboring base stations for handoff that may be performed by the central processing unit in the mobile switching center.

A detailed flow chart description of a procedure which may be followed by the central processing unit 200 of the mobile switching center for implementing the present invention is illustrated in FIGS. 6–9. The flow diagram in FIG. 6 shows a control procedure called "locating request" for locating neighboring base stations for handoff. Initially at step 220, the mobile switching center receives signal strength values from neighboring base stations assigned to neighboring cells 1, 2, ..., N.

In response to a locating request, the central processing unit 200 determines in step 222 the optimal base station for receiving that handoff call connection. The optimal base station is determined based on one or more signal parameters, such as signal strength, of the call connection. Using signal strength as an example, "optimal" means the signal having the greatest signal strength. The optimally determined base station is identified as the target base station or cell. Once one or more target base stations have been identified in step 222, program control proceeds to step 224 where the central processing unit 200 polls all general channels corresponding to a target base station or cell to determine if there is an available channel.

If a general channel is available in the target base station, that channel is assigned to the handoff for new call requests. If no general channels are available, the central processing unit 200 polls those channels reserved for handoffs in the target base station in decision step 228. If a reserved channel is available, it is assigned to the handoff request in step 230. In decision step 232, it is determined if there are any other target base stations. If one or more target base stations remain, steps 224-230 are re-executed. Otherwise, program control proceeds to step 234 where the handoff request is added to each target base station's handoff request queue. In other words, if every target base station is so congested that no general or reserve channel is available for a handoff request, that handoff request is stored in each handoff request queue for each target base station.

Figure 7:
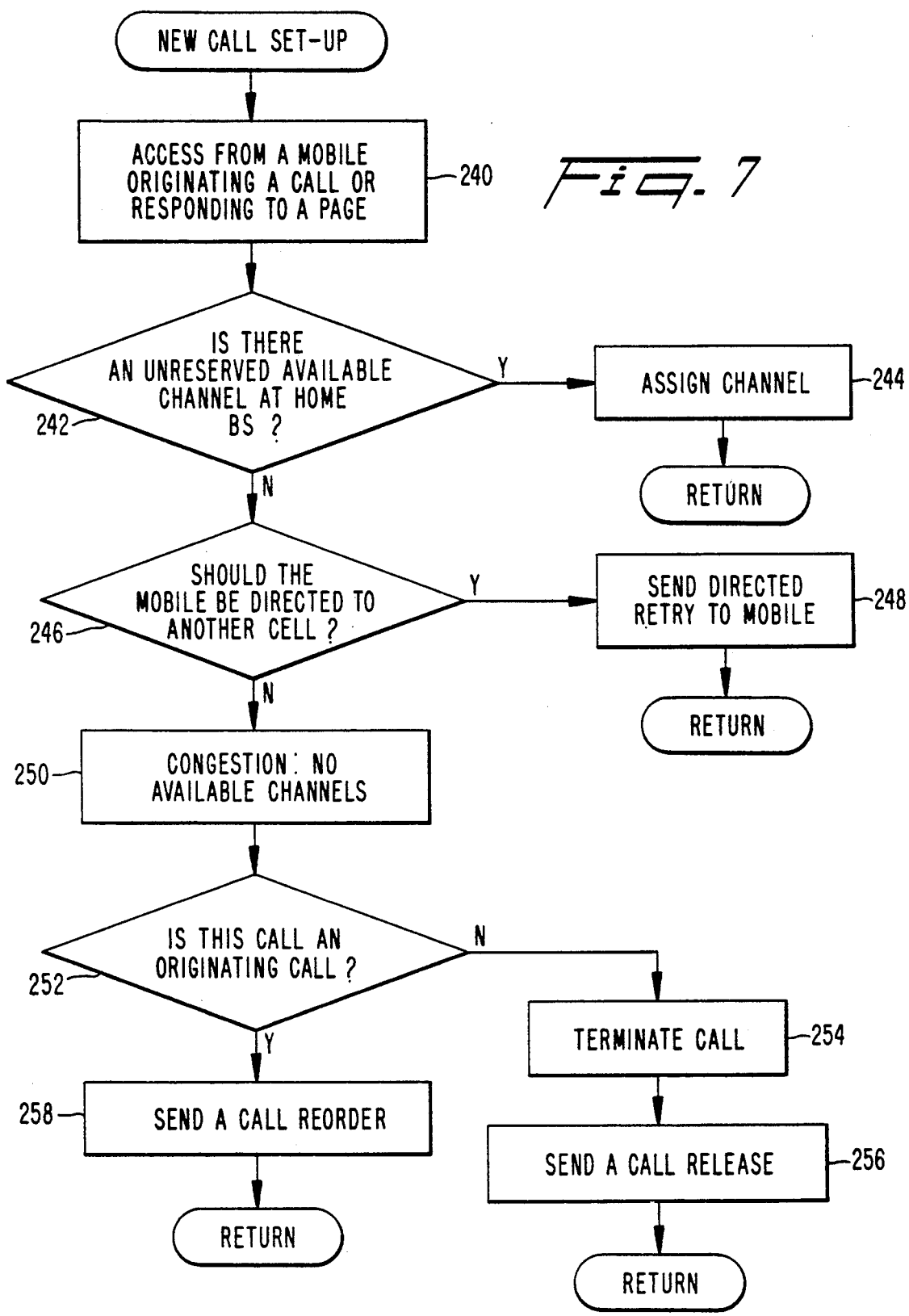
FIG. 7 is a flow chart of channel assignment procedures for new call setups that may be performed by the central processing unit in the mobile switching center.

For purposes of comparing the locating request channel assignment procedure outlined in FIG. 6, the channel assignment procedures for new call setups is illustrated in FIG. 7. In step 240, a mobile access is generated in response to a mobile station originating a call or responding to a page. Typically, the mobile will be assigned an available, unreserved voice channel associated with its home base station. As depicted in step 244, if no unreserved channels are available in the home base station, control proceeds to the decision step 246 where the mobile switching center determines whether the mobile should be directed to another cell. If so, a directed retry message is sent to the mobile in step 248. Otherwise, all available channels are occupied due to congestion on the network as depicted in step 250. If it is determined in step 252 that this is an originating call, a call reorder message is sent in step 258 to the mobile station. Non-originating calls are terminated in step 254 and followed by a call release command in 256.

Figure 8:
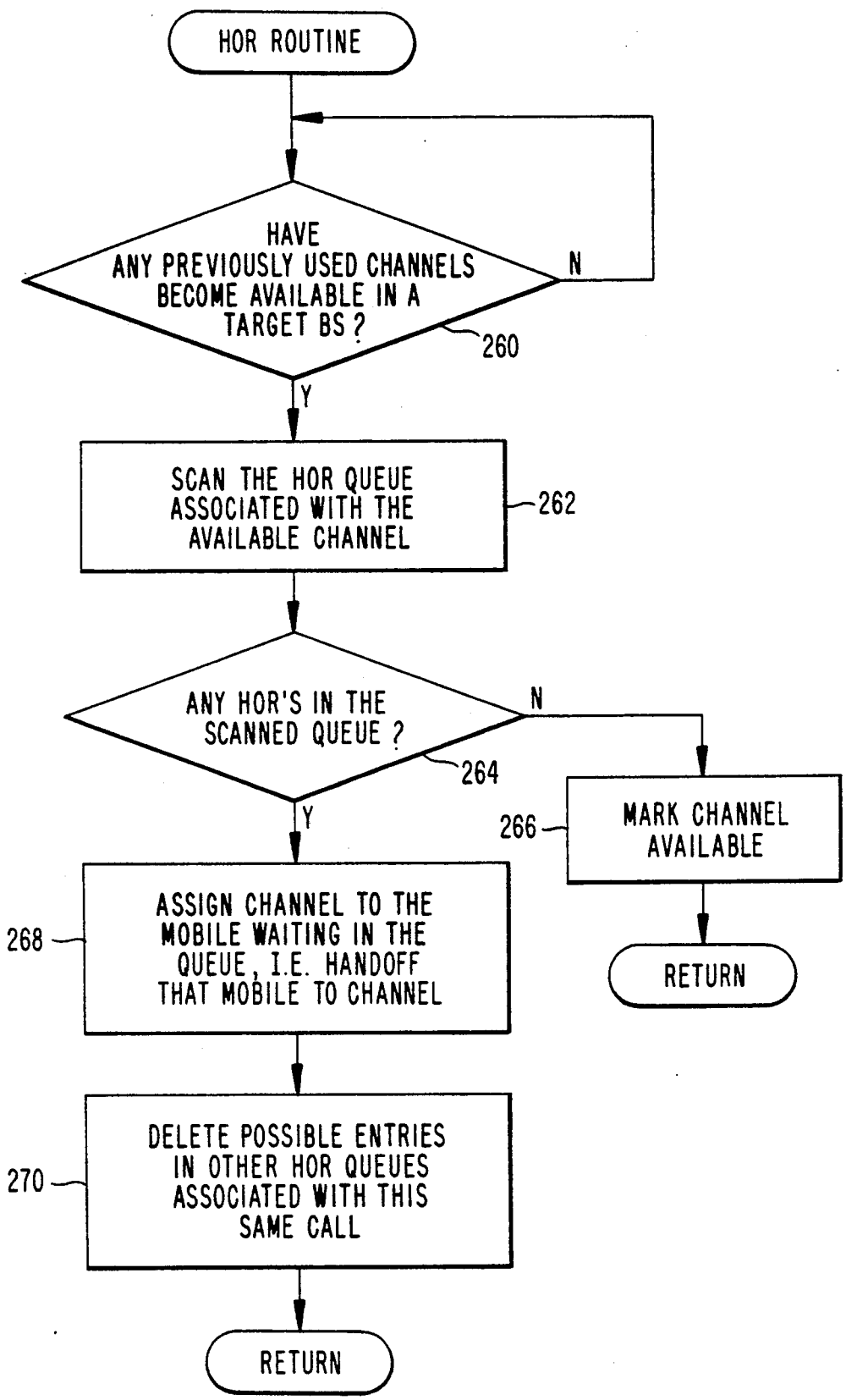
FIG. 8 is a flow chart of a handoff request service routine that may be performed by the central processing unit in the mobile switching center.

The handoff request service routine is depicted in FIG. 8. In decision step 260, the central processing unit 200 of the mobile switching center determines whether any previously used channels have become available in a target base station. If not, control loops back to the beginning of the handoff request routine. If a channel is available, control proceeds to step 262 where the central processing unit 200 scans the handoff request (HOR) queue associated with the available channel. In decision step 264, if there are no handoff requests in the scanned HOR queue, the channel is marked available in step 266. If there are handoff requests in the scanned HOR queue, the available channel is assigned to the queued mobile in step 268. In other words, the mobile's handoff request is granted, and the call connection is transferred to the newly available voice channel in that target base station. After the handoff has been completed, control proceeds to step 270 where parallel handoff request entries in other handoff request queues corresponding to other target base stations are deleted.

Figure 9:
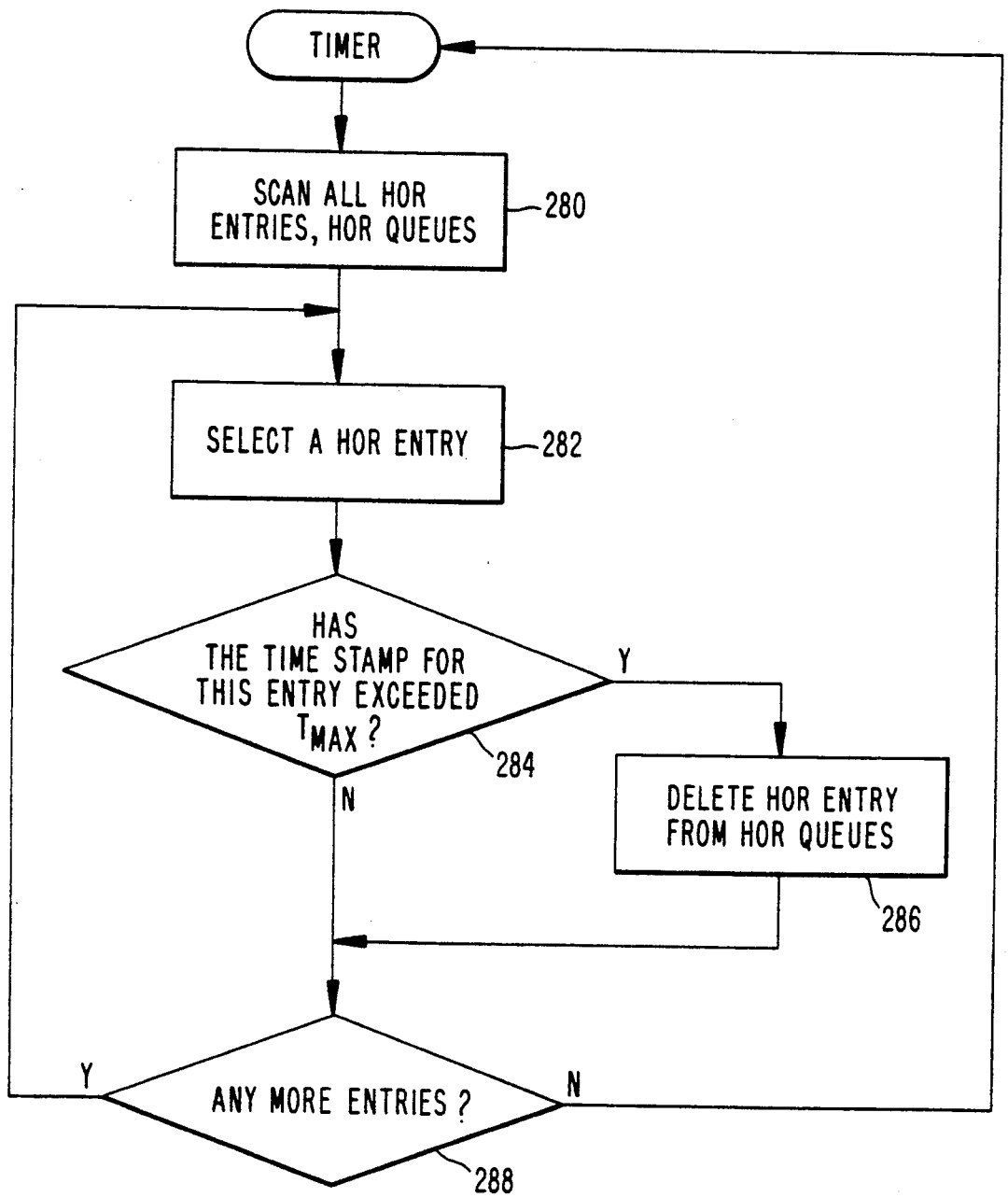
FIG. 9 is a flow chart of a timing routine that may be performed by the central processing unit in the mobile switching center.

As described earlier, each handoff request has a limited life in the handoff request queues. A software timing routine labelled "timer" in FIG. 9 is used to monitor the time each handoff request has been stored in each handoff request queue 210. In step 280, all of the handoff request entries in all of the handoff request queues 204 are scanned. In step 282, a handoff request entry is selected for examination. In decision step 284, the timer routine determines if the time stamp for this particular handoff request entry has exceeded the maximum time $T_{MAX}$ that the handoff request may be stored in a handoff request queue. If the time stamp exceeds $T_{MAX}$, that handoff request entry is deleted in step 286 from all handoff request queues. Otherwise, control proceeds to decision block 288 to determine if any further handoff request entries exist. If no entries are to be made, the timer routine begins again. Otherwise, control returns to step 282 where another handoff request entry is selected.

Thus, the present invention provides a structure and a procedure for rapidly and reliably accomplishing call handoffs as mobile stations exit one cell and enter another. Given the practical limitations in the number of available voice channels during peak use periods or in congested urban areas, the present invention provides a means for prioritizing and preserving ongoing call connections. In particular, the present invention insures that handoff requests to a particular target cell receive paramount consideration to ensure that optimal conditions exist, if at all possible, for handoff requests.

While a particular embodiment of the present invention has been described and illustrated, it should be understood that the invention is not limited thereto since modifications may be made by persons skilled in the art. In particular it should be understood that the invention may be implemented in analog systems or digital systems or combined analog/digital systems. The invention may be implemented in systems using FDMA, TDMA, or CDMA. Thus, depending on the type of system, a channel between a base station and a mobile station may occupy/constitute a complete radio frequency, a time slot of a radio frequency, a code or any part thereof appropriate for the interstation radio signalling in question. The present disclosure contemplates any and all modifications that fall within the sphere and scope of the underlying invention disclosed and claimed herein.

What is claimed is:

1. A method for ensuring that handoff call requests take priority over new call requests to engage voice channels assigned to at least one geographical target cell in a cellular mobile radiotelephone communications system, comprising:

determining whether any voice channels are available for assignment to call requests for said target cell;

storing said handoff call requests to said target cell in a queue for a predetermined period of time in response to a determination that no voice channels are available;

examining said queue for queued handoff requests when one or more voice channels becomes available in said target cell;

assigning queued handoff requests to voice channels that become available in said target cell during said time period; and assigning new cell requests to said available voice channels in said target cell only when said queue is empty.

2. The method according to claim 1, wherein for plural target cells each target cell has a corresponding queue for storing handoff requests to that target cell.

3. The method according to claim 1, further comprising:
removing handoff requests that have been stored in said queue longer than said predetermined time.

4. The method according to claim 1, further comprising:
reserving a specified number of voice channels in said target cell solely for handoff requests;
assigning handoff requests to both reserved and unreserved voice channels; and
assigning new call requests only to unreserved voice channels.

5. In a cellular mobile radiotelephone communications system having plural geographically-separated radio base stations serving corresponding plural geographical cells, a method for prioritizing new call and handoff requests to engage voice channels assigned to at least one target geographical cell, comprising:
(a) reserving at said target cell a predetermined number of reserved voice channels for servicing only handoff requests;
(b) queuing handoff requests to said target cell in response to a determination that no reserved or unreserved voice channels are available in said target cell;
(c) assigning said queued handoff requests to voice channels that become available in said target cell; and
(d) assigning new call requests to unreserved voice channels that become available in said target cell only when no handoff requests are queued in said queuing step.

6. The method according to claim 5, wherein said queuing step includes prioritizing said queued handoff requests and said handoff request assigning step includes assigning said queued handoff requests in order from highest to lowest priority.

7. The method according to claim 5, wherein said step of queuing handoff requests further includes:
monitoring a period of time said queued handoff requests remain queued, and
removing queued handoff requests when said time period exceeds a predetermined value.

8. The method according to claim 5, further comprising:
repeating steps (a)-(d) for plural target cells.

9. A cellular mobile radiotelephone communications system for ensuring that handoff requests take priority over new call requests to occupy voice channels assigned to at least one geographical target cell, comprising:
input means for receiving a signal representing the number of available voice channels;
means, coupled to said input means, for preventing a new call request from seizing an available voice channel in said target cell in response to a determination that the number of available voice channels is less than a preset number;
means, coupled to said input means, for allowing only a handoff request to seize an available voice channel in said target cell in response to the number of available voice channels being less than said preset number;
means, coupled to said input means, for queuing handoff requests for said target cell in response to a determination that no voice channels in said target cell are available;
means, coupled to said queuing means, for assigning queued handoff requests to the next available voice channel in said target cell; and
means, coupled to said input means and to said queuing means, for allowing new call requests to seize available voice channels in said target cell only in response to a determination that no handoff requests are queued and that the number of available voice channels exceeds said preset number.

10. The system according to claim 9, wherein said queuing means includes a plurality of queues, each queue corresponding to one of a plurality of target cells and storing handoff requests to said corresponding queue and wherein said handoff requests are stored in said corresponding queue in order of receipt.

11. The system according to claim 10, further comprising:
means, coupled to the queuing means, for timing the amount of time each handoff requests resides in said corresponding queue;
means, coupled to the timing means, for comparing the elapsed time amount of each handoff requests to a predetermined time; and
means, coupled to the queuing means, for removing from said corresponding queue handoff requests whose elapsed time exceeds said predetermined time.

12. The system according to claim 10, wherein each target cell has a corresponding queue and handoff requests to a target cell are stored in said corresponding queue in order of greatest priority.

* * * * *